United States Patent
Huang et al.

(10) Patent No.: US 9,680,312 B2
(45) Date of Patent: Jun. 13, 2017

(54) SYSTEM AND METHOD FOR REACTIVE POWER CONTROL IN DYNAMIC INDUCTIVE POWER TRANSFER SYSTEMS

(71) Applicant: QUALCOMM Incorporated, San Diego, CA (US)

(72) Inventors: Chang-Yu Huang, Auckland (NZ); Nicholas Athol Keeling, Auckland (NZ); Mickel Bipin Budhia, Auckland (NZ); Jonathan Beaver, Auckland (NZ); Michael Le Gallais Kissin, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 14/482,943

(22) Filed: Sep. 10, 2014

(65) Prior Publication Data
US 2016/0072299 A1    Mar. 10, 2016

(51) Int. Cl.
*H02J 5/00*        (2016.01)
*B60L 11/18*      (2006.01)
(Continued)

(52) U.S. Cl.
CPC .............. *H02J 5/005* (2013.01); *B60L 11/14* (2013.01); *B60L 11/182* (2013.01);
(Continued)

(58) Field of Classification Search
CPC ..................................................... H02J 5/005
(Continued)

(56) References Cited

U.S. PATENT DOCUMENTS 8,729,737 B2    5/2014 Schatz et al.
2009/0302688 A1   12/2009 Boys
(Continued)

FOREIGN PATENT DOCUMENTS

EP          2196351 A1    6/2010
WO     WO-2014007656 A1   1/2014

OTHER PUBLICATIONS

International. Search Report and Written Opinion—PCT/US2015/047192—ISA/EPO—Nov. 4, 2015.

*Primary Examiner* — Joseph Chang
(74) *Attorney, Agent, or Firm* — Knobee, Martens, Olson & Bear, LLP

(57) ABSTRACT

Systems and methods for dynamically tuning reactive power in an inductive power transfer system are disclosed. The system comprises a first plurality of coils operably coupled to a respective ferromagnetic material, configured to receive wireless power via the ferromagnetic material from a power source. The system further comprises a plurality of switches configured to selectively control power received by certain of the first plurality of coils. The system further comprises a second plurality of coils configured to receive current from respective ones of the first plurality of coils and deliver wireless power to a wireless power receiver. The system further comprises at least one control unit configured to selectively activate the switches. The switches may be set to provide power from the power source to a portion of the plurality of the second coils or selectively increase or decrease the reactive power load of the power source.

29 Claims, 8 Drawing Sheets

(51) Int. Cl.
*H02J 7/02* (2016.01)
*B60L 11/14* (2006.01)

(52) U.S. Cl.
CPC ....... *B60L 11/1805* (2013.01); *B60L 11/1831* (2013.01); *H02J 7/025* (2013.01); *B60L 2200/12* (2013.01); *B60L 2200/22* (2013.01); *B60L 2210/30* (2013.01); *Y02T 10/70* (2013.01); *Y02T 10/7005* (2013.01); *Y02T 10/7072* (2013.01); *Y02T 10/7077* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
USPC .......................................................... 307/104
See application file for complete search history.

(56) References Cited

U.S. PATENT DOCUMENTS

| | | |
|---|---|---|
| 2012/0169137 A1 | 7/2012 | Lisi et al. |
| 2012/0217111 A1* | 8/2012 | Boys ................ H01F 38/14 191/10 |
| 2013/0175874 A1 | 7/2013 | Lou et al. |
| 2013/0193276 A1 | 8/2013 | Hunter |
| 2014/0203659 A1 | 7/2014 | Madawala et al. |

* cited by examiner

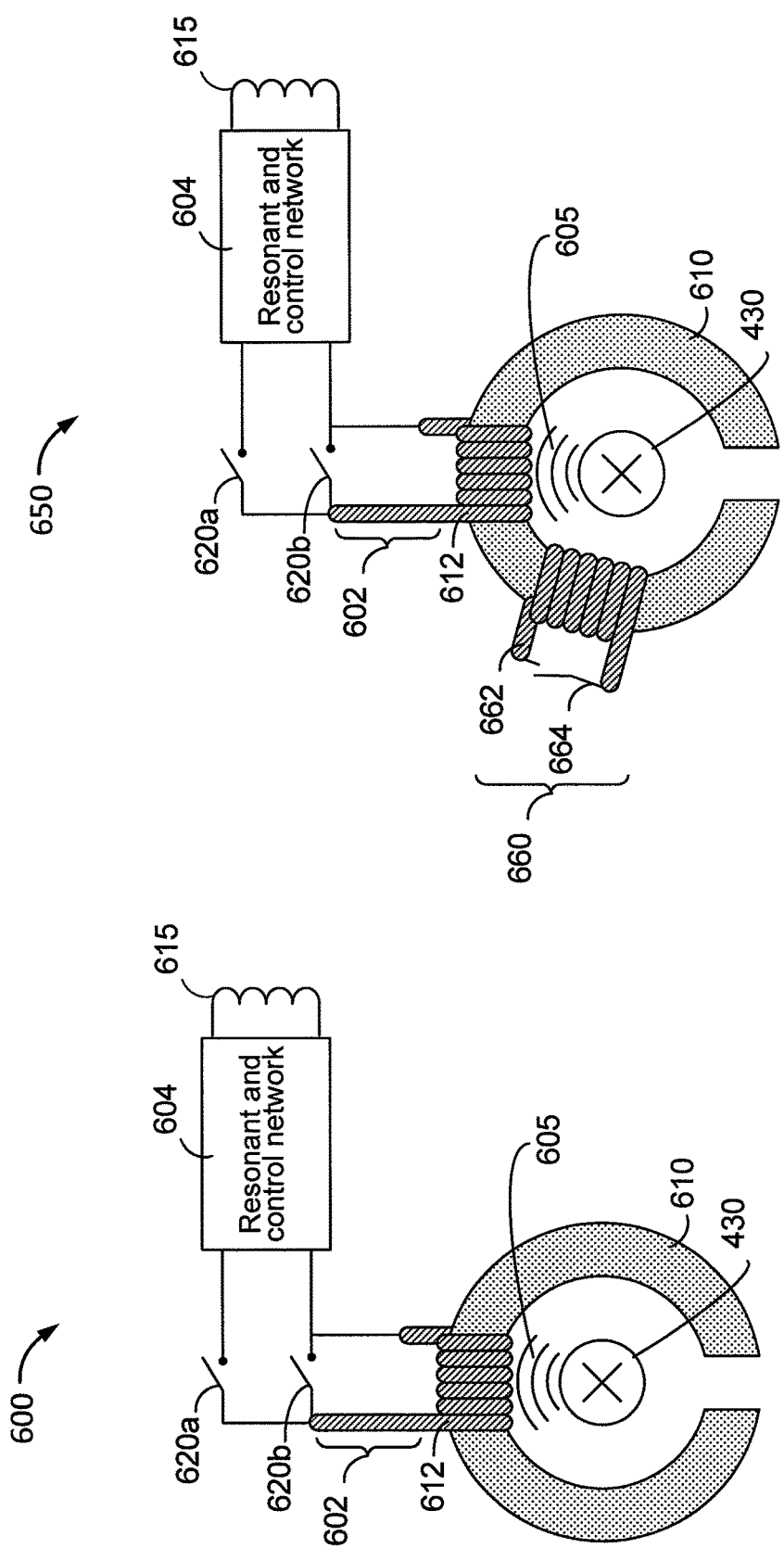

SYSTEM AND METHOD FOR REACTIVE POWER CONTROL IN DYNAMIC INDUCTIVE POWER TRANSFER SYSTEMS

TECHNICAL FIELD

This application is generally related to wireless power charging of chargeable devices such as electric vehicles.

BACKGROUND

Chargeable systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. It is desirable to provide wireless charging systems that are capable of transferring power in free space (e.g., via a wireless field) to be used to charge the electric vehicle to overcome some of the deficiencies of wired charging solutions.

Embodiment of wireless charging systems may require the use of ferromagnetic materials. The presence of such materials may influence the overall reactive power balance of a system. Accordingly, wireless charging system should be capable of balancing overall reactive power using existing system components to properly coordinate the transfer of power continuously to a moving receiver.

SUMMARY

One aspect of the disclosure provides a device for dynamically tuning reactive power in an inductive power transfer system comprising a first plurality of coils. Each coil of the plurality of coils is operably coupled to a respective ferromagnetic material. Each coil of the plurality of coils is configured to receive wireless power via the ferromagnetic material from a power source. The device further comprises a plurality of switches associated with each of the first plurality of coils. The switches are configured to selectively control power received by certain of the first plurality of coils. The device further comprises a second plurality of coils configured to receive current from respective ones of the first plurality of coils. The second plurality of coils is further configured to deliver wireless power to a wireless power receiver. The device further comprises at least one control unit configured to selectively activate the switches. The switches may be configurably set to convey power from the power source to at least one of the plurality of the second coils or selectively increase or decrease the reactive power load of the power source.

Another aspect of the disclosure provides a method for dynamically tuning reactive power in an inductive power transfer system. The method comprises receiving at a first plurality of coils, wireless power via a ferromagnetic material from a power source. Each coil of the first plurality of coils is operably coupled to the respective ferromagnetic material. The method further comprises selectively controlling, at a plurality of switches, power received by certain of the first plurality of coils. Each switch of the plurality of switches is associated with each coil of the first plurality of coils. The method further comprises receiving, at a second plurality of coils, current from respective ones of the first plurality of coils. The method further comprises delivering, by the second plurality of coils, wireless power to a wireless power receiver. The method further comprises selectively activating the switches by at least one control unit. The switches are configurably set to provide convey from the power source to at least one of the plurality of the second coils or selectively increase or decrease the reactive power load of the power source.

Another aspect of the disclosure provides an apparatus for dynamically tuning reactive power in an inductive power transfer system. The apparatus comprises first means for receiving wireless power via a ferromagnetic material from a power source. The first receiving means is operably coupled to the respective ferromagnetic material. The apparatus further comprises means for selectively controlling power received by certain of the first receiving means. The controlling means is associated with each of the first receiving means. The apparatus further comprises second means for receiving current from respective ones of the first receiving means. The apparatus further comprises means for delivering wireless power to a wireless power receiver. The apparatus further comprises means for selectively activating the controlling means. The controlling means configurably set to convey power from the power source to at least one of the plurality of the second receiving means or selectively increase or decrease the reactive power load of the power source.

Another aspect of the disclosure provides a non-transitory computer-readable medium. The medium comprise instructions, that when executed, cause a inductive power transfer system to receive at a first plurality of coils, wireless power via a ferromagnetic material from a power source, wherein each coil of the first plurality of coils is operably coupled to the respective ferromagnetic material. The medium further causes the inductive power transfer system to selectively control, at a plurality of switches, power received by certain of the first plurality of coils. Each switch of the plurality of switches is associated with each coil of the first plurality of coils. The medium further causes the inductive power transfer system to receive, at a second plurality of coils, current from respective ones of the first plurality of coils. The medium further causes the inductive power transfer system to deliver, by the second plurality of coils, wireless power to a wireless power receiver. The medium further causes the inductive power transfer system to selectively activate the switches by at least one control unit, wherein the switches are configurably set to convey power from the power source to a portion of the plurality of the second coils or selectively increase or decrease the reactive power load of the power source.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise. Note that the relative dimensions of the following figures may not be drawn to scale.

FIG. 6A depicts an embodiment of a balance control switching system according to the disclosure.

FIG. 6B depicts an embodiment of a balance control switching system with a ramp control switch according to the disclosure.

DETAILED DESCRIPTION

Figure 1:
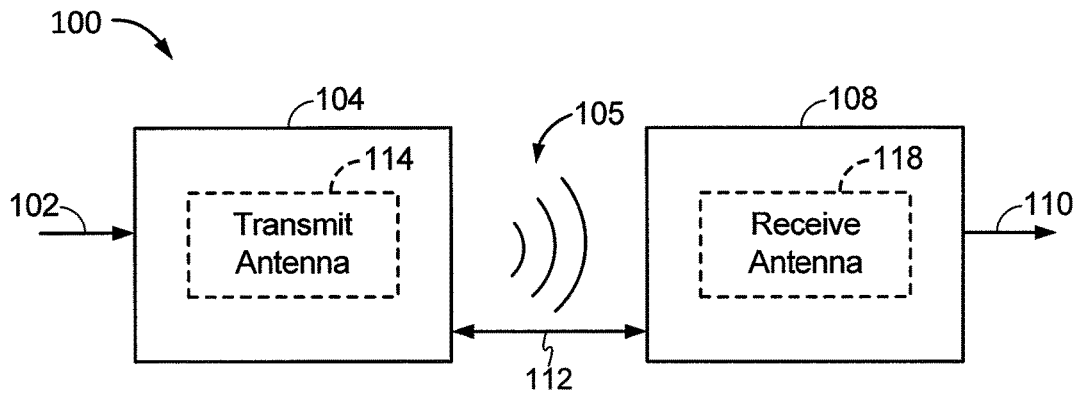
FIG. 1 is a functional block diagram of a wireless power transfer system, in accordance with one example of an embodiment.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive antenna" to achieve power transfer.

An electric vehicle is used herein to describe a remote system, an example of which is a vehicle that includes, as part of its motion capabilities, electrical power derived from a chargeable energy storage device (e.g., one or more rechargeable electrochemical cells or other type of battery). As non-limiting examples, some electric vehicle may be hybrid electric vehicles that include besides electric motors, a traditional combustion engine for direct locomotion or to charge the vehicle's battery. Other electric vehicles may draw all locomotion ability from electrical power. The electric vehicle is not limited to an automobile and may include motorcycles, carts, scooters, and the like. By way of example and not limitation, a remote system is described herein in the form of the electric vehicle (EV). Furthermore, other remote systems that may be at least partially powered using a chargeable energy storage device are also contemplated (e.g., electronic devices such as personal computing devices and the like).

The terminology used herein is for the purpose of describing particular embodiments only and is not intended to be limiting of the disclosure. It will be understood that if a specific number of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

FIG. 1 is a functional block diagram of a wireless power transfer system 100, in accordance with one example embodiment. An input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate an output power 110 for storing or consumption by a device (not shown in this figure) coupled to the output power 110. Both the transmitter 104 and the receiver 108 are separated by a distance 112.

In one example embodiment, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are minimal. As such, wireless power transfer may be provided over a larger distance in contrast to purely inductive solutions that may require large antenna coils which are very close (e.g., sometimes within millimeters). Resonant inductive coupling techniques may thus allow for improved efficiency and power transfer over various distances and with a variety of inductive coil configurations.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near-field" of the transmitter 104 as will be further described below. The transmitter 104 may include a transmit antenna or coil 114 for transmitting energy to the receiver 108. The receiver 108 may include a receive antenna or coil 118 for receiving or capturing energy transmitted from the transmitter 104. The near-field may correspond to a region in which there are strong reactive fields resulting from the currents and charges in the transmit coil 114 that minimally radiate power away from the transmit coil 114. The near-field may correspond to a region that is within about one wavelength (or a fraction thereof) of the transmit coil 114.

As described above, efficient energy transfer may occur by coupling a large portion of the energy in the wireless field 105 to the receive coil 118 rather than propagating most of the energy in an electromagnetic wave to the far field. When positioned within the wireless field 105, a "coupling mode" may be developed between the transmit coil 114 and the receive coil 118. The area around the transmit antenna 114 and the receive antenna 118 where this coupling may occur is referred to herein as a coupling-mode region.

Figure 2:
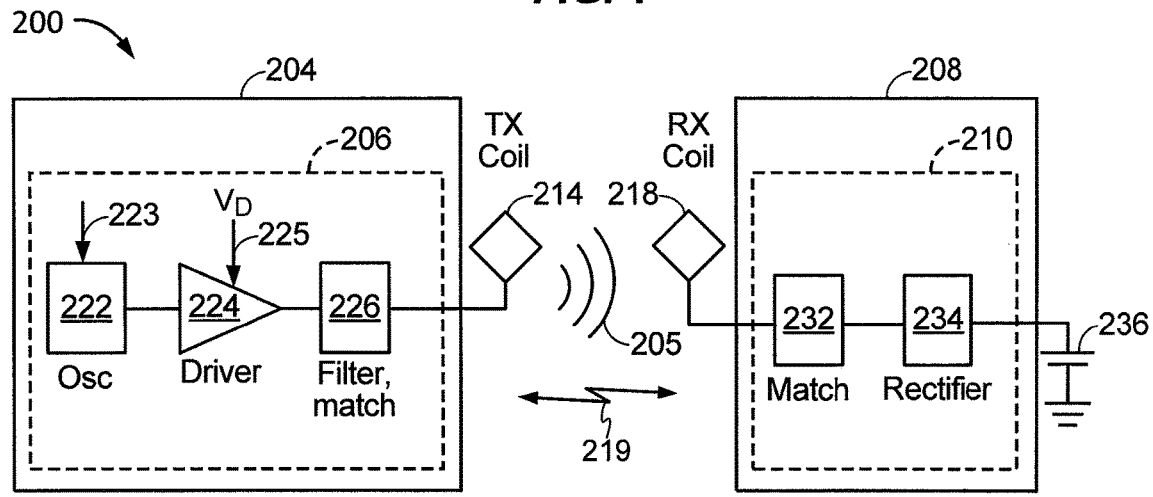
FIG. 2 is a functional block diagram of a wireless power transfer system, in accordance with another example embodiment.

FIG. 2 is a functional block diagram of a wireless power transfer system 200, in accordance with another example embodiment. The system 200 may be a wireless power transfer system of similar operation and functionality as the system 100 of FIG. 1. However, the system 200 provides additional details regarding the components of the wireless power transfer system 200 than FIG. 1. The system 200 includes a transmitter 204 and a receiver 208. The transmitter 204 may include a transmit circuitry 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit antenna 214 at, for example, a resonant frequency of the transmit antenna 214 based on an input voltage signal (VD) 225. The driver circuit 224 may be a switching amplifier configured to receive a square wave from the oscillator 222 and output a sine wave. For example, the driver circuit 224 may be a class E amplifier.

The filter and matching circuit 226 may filter out harmonics or other unwanted frequencies and match the impedance of the transmitter 204 to the transmit antenna 214. As a result of driving the transmit antenna 214, the transmit antenna 214 may generate a wireless field 205 to wirelessly output power at a level sufficient for charging a battery 236 of the electric vehicle 605, for example.

The receiver 208 may include a receive circuitry 210 that may include a matching circuit 232 and a rectifier circuit 234. The matching circuit 232 may match the impedance of the receive circuitry 210 to the receive antenna 218. The rectifier circuit 234 may generate a direct current (DC) power output from an alternate current (AC) power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236.

Figure 3:
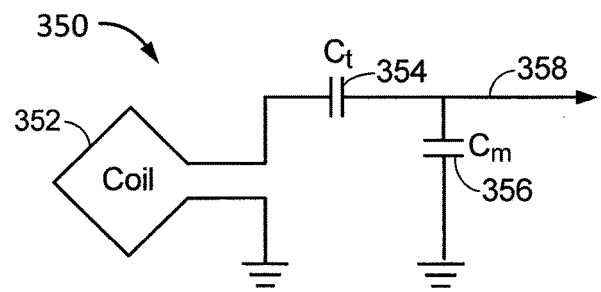
FIG. 3 is a schematic diagram of a portion of transmit circuitry or receive circuitry of FIG. 2 including a transmit or receive antenna, in accordance with some example embodiments.

FIG. 3 is a schematic diagram of a portion of the transmit circuitry 206 or the receive circuitry 210 of FIG. 2, in accordance with some example embodiments. As illustrated in FIG. 3, a transmit or receive circuitry 350 may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, the antenna 352 is an example of a "power transfer component" of a type that is configured to wirelessly output and/or receive power.

The antenna 352 may include an air core or a physical core such as a ferrite core (not shown in this figure). Air core loop antennas may be more tolerable to extraneous physical devices placed in the vicinity of the core. Furthermore, an air core loop antenna 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 may be more powerful.

As stated, efficient transfer of energy between the transmitter 104 (transmitter 204 as referenced in FIG. 2) and the receiver 108 (receiver 208 as referenced in FIG. 2) may occur during matched or nearly matched resonance between the transmitter 104 and the receiver 108. However, even when resonance between the transmitter 104 and receiver 108 are not matched, energy may be transferred, although the efficiency may be affected. For example, the efficiency may be less when resonance is not matched. Transfer of energy occurs by coupling energy from the wireless field 105 (wireless field 205 as referenced in FIG. 2) of the transmit coil 114 (transmit coil 214 as referenced in FIG. 2) to the receive coil 118 (receive coil 218 as referenced in FIG. 2), residing in the vicinity of the wireless field 105, rather than propagating the energy from the transmit coil 114 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. Accordingly, for larger diameter antennas, the size of capacitance needed to sustain resonance may decrease as the diameter or inductance of the loop increases.

Furthermore, as the diameter of the antenna increases, the efficient energy transfer area of the near-field may increase. Other resonant circuits formed using other components are also possible. As another non-limiting example, a capacitor may be placed in parallel between the two terminals of the circuitry 350. For transmit antennas, the signal 358, with a frequency that substantially corresponds to the resonant frequency of the antenna 352, may be an input to the antenna 352.

In FIG. 1, the transmitter 104 may output a time varying magnetic (or electromagnetic) field with a frequency corresponding to the resonant frequency of the transmit coil 114. When the receiver 108 is within the wireless field 105, the time varying magnetic (or electromagnetic) field may induce a current in the receive coil 118. As described above, if the receive coil 118 is configured to resonate at the frequency of the transmit coil 114, energy may be efficiently transferred. The AC signal induced in the receive coil 118 may be rectified as described above to produce a DC signal that may be provided to charge or to power a load.

Many current wireless vehicle charging systems require the electric vehicle being charged to be stationary, i.e., stopped near or above the wireless charging system such that the electric vehicle maintains presence within the wireless field generated by the wireless charging system for transferring charge. Thus, while the electric vehicle is being charged by such a wireless charging system, the electric vehicle may not be used for transportation. Dynamic wireless charging systems that are capable of transferring power across free space may overcome some of the deficiencies of stationary wireless charging stations.

On a roadway with a dynamic wireless charging system comprising a plurality of the base pads placed linearly along a path of travel, the electric vehicle may travel near the plurality of the base pads while traveling on the road. Should the electric vehicle desire to charge its batteries or source energy to power the electric vehicle while traveling, in order to extend its range or reduce the need to charge later, the electric vehicle may request the dynamic wireless charging system activate the base pads along the electric vehicle's path of travel. Such dynamic charging may also serve to reduce or eliminate the need for auxiliary or supplemental motor systems in addition to the electric locomotion system of the electric vehicle (e.g., a secondary gasoline engine of the hybrid/electric vehicle). As such, dynamic wireless charging systems and methods that efficiently and effectively activate the base pads along a path of travel of the electric vehicle are needed.

Figure 4A:
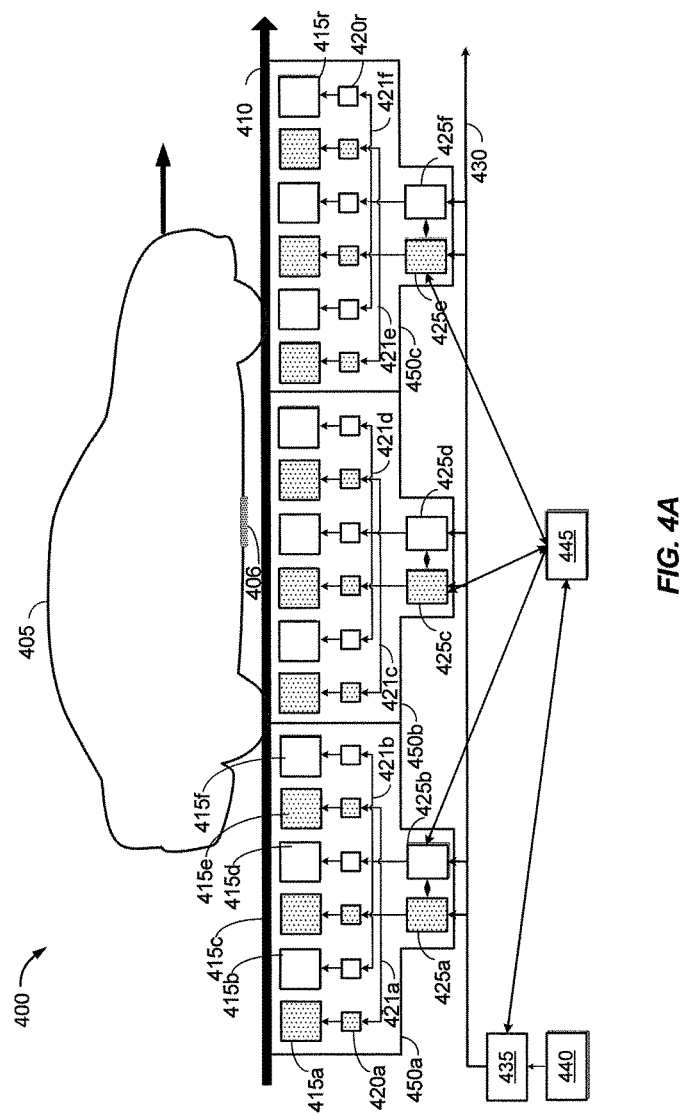
FIG. 4A illustrates a schematic view of an electric vehicle with at least one vehicle pad in the presence of a dynamic wireless electric vehicle charging system in accordance with an embodiment.

FIG. 4A illustrates a schematic view of an electric vehicle 405 with at least one vehicle pad 406 in the presence of a wireless power transfer system 400, in accordance with an exemplary embodiment. As shown in FIG. 4A, various components of a distribution network of a wireless power transfer system 400 are installed beneath, along or beside a roadway 410. The roadway 410 extends from the left side of FIG. 4A to the right side of FIG. 4A, with a direction of travel of the electric vehicle 405 aligned with the roadway 410. The electric vehicle 405 may comprise at least one vehicle pad 406, similar to the receivers 108/208, as previously described in connection with FIGS. 1 and 2, respectively.

In some embodiments, the vehicle pad 406 may comprise a polarized coupling system (e.g., a double-D coil), a quadrature coil system, combined double-D quadrature coil system, or any other system utilizing any other type or shape of coil (e.g., circular, rectangular, or solenoid shapes). A vehicle pad 406 (secondary coil) may couple with the magnetic field emitted by the primary coil to receive flux. In some embodiments, the vehicle pad 406 (secondary coil) may be selected to compliment the primary coil(s) so as to couple with as much of the magnetic field to maximize the received flux. If the primary coil is producing polarized (i.e., horizontal) flux, then a polarized type of vehicle pad 406 may be used in the coupling system (e.g., a double-D coil or a solenoid); alternatively, if the primary coil is producing vertical flux, then a circular coil or a quadrature coil may be used. If the primary coil is producing a combination of horizontal and vertical flux, then a combination vehicle pad 406 may be used, e.g., a DDQ coil. The "double-D" may refer to placing two D-shaped coils back to back such that the overall shape of the coil is round. A quadrature coil may use four coils as opposed to only two, in various geometries. The dynamic wireless charging system 400 may further comprise a plurality of base pads 415a-415r installed in, on, beside, or flush with the roadway 410. Each of the base pads 415a-415r may be configured to generate a wireless field (see the wireless field 205 of FIG. 2) for wirelessly transferring power to the electric vehicle 405 via the at least one vehicle pad 406 when activated. Each of a plurality of switches 420a-420r, may be configured to operationally connect a respective one of the base pads 415a-415r to one of a plurality of local controllers 425a-425f via one of a plurality of distribution circuits 421a-421f. The local controllers 425a-425f may be configured to wirelessly receive power from a power supply/inverter 435, via an alternating current (AC) power backbone 430, and control an amount of power transferred to one or more of the plurality of base pads 415a-415r via the switches 420a-420r. As used herein, components having multiple iterations (e.g., the base pads 415a-415r) may be referred to collectively by a single number for simplicity. For example: the base pads 415, the switches 420, the distribution circuits 421, and the local controllers 425.

The power supply/inverter 435 may receive its power from a power source 440. The power source 440 and/or the power supply/inverter 435 may be configured to transfer power based on a number of base pads 415 to power, a number of local controllers 425, and/or a number and type of electric vehicles 405 to be charged. The power source 440 and the power supply/inverter 435 may provide current at a frequency utilized by the base pads 415 or, alternatively, at some higher or lower frequency. The AC power backbone 430 may comprise a loop conductor that distributes the high frequency (HF) power and may be capable of synchronizing the base pads 415 and/or the local controllers 425 that are near each other to a single phase. Thus, the AC power backbone 430 may be considered a phase reference that also distributes power.

The dynamic wireless charging system 400 may further comprise a distribution controller 445. The distribution controller 445 may operationally connected to the power supply/inverter 435 and the local controllers 425a-425f. The distribution controller 445 may be configured to provide global coordination of power control between the local controllers 425a-425f. The base pads 415, the switches 420, and the local controllers 425 may be grouped in a series of individual Base Array Network (BAN) modules 450a-450c. For example, each of the BAN modules 450a-450c may comprise six base pads 415 and two local controllers 425, although other arrangements and numbers of base pads and local controllers for BAN modules may be used in other embodiments. The respective components of the BAN modules 450 are shaded to indicate respective common current paths.

As the electric vehicle 405 travels along the roadway 410, the distribution controller 445 may communicate with one or more of the electric vehicle 405, the power supply/inverter 435, and the local controllers 425a-425f to coordinate activation or deactivation of particular ones of the base pads 415a-r. For example, the distribution controller 445 may command the power supply/inverter 435 to generate a current and distribute the current to the AC power backbone 430. The AC power backbone 430 may utilize the distributed current to wirelessly supply power to the local controllers 425a-425f via a "double couple transformer" (e.g., "double couple units"), the function of which will be described in more detail in connection with FIG. 5-FIG. 8 below.

The local controllers 425a-425f may receive the power from the AC power backbone 430 and provide a regulated amount of current to one or more of the base pads 415a-r. In some embodiments, the local controllers 425 in each BAN module 450 may comprise individual control units capable of independent control from each other. Alternatively, the local controllers 425 of each BAN module 450 may comprise a single, shared control unit or processor. The base pads 415a-415r may generate wireless fields according to the current received via the respective switch 420a-420r from the local controller 425a-425f and may couple to the at least one vehicle pad 406 to wirelessly transfer power to the electric vehicle 405.

Depending on the particular embodiment, control of activation of the base pads 415 may be shared to differing degrees between the distribution controller 445 and the local controllers 425a-425f. For example, in some embodiments, the distribution controller 445 may coordinate the activation and deactivation of the base pads 415a-415r and may coordinate any communications or actions between multiple BAN modules 450a-450c. In some other embodiments, the distribution controller 445 may simply coordinate communications between the BAN modules 450a-450c or the local controllers 425a-425f, while the local controllers 425a-425f may control the base pad activation and sequencing. In other embodiments, the distribution controller 445 may activate a particular BAN module 450a-450c, but leave timing of the base pad activations to the associate local controller(s) 425a-425f. In yet other embodiments, the distribution controller 445 may communicate only non-critical information to the local controllers 425a-425f and not provide base pad activation information.

Higher level coordination by the distribution controller 445, combined with the more localized current distribution and regulation at the local controllers 425a-425f may create a more responsive dynamic wireless charging system 400 with decentralized control via the local controllers 425a-425f. This may allow the local controllers 425a-425f to control current flow independently of the distribution controller 445 and allow local control of impedance matching and reactive voltage/amperage (VAr) loading. Such localized control may provide a decreased VAr load compensation response time since instructions need only come from the local controller 425a-425f and not from the distribution controller 445.

The distribution controller 445 may also obtain information regarding the velocity of the electric vehicle 405 for controlling activation of particular ones of the base pads 415a-415r. The distribution controller 445 may obtain this information from the electric vehicle 405 or from various sensors or load analysis of the base pads 415a-415r. In other embodiments, each of the BAN modules 450a-450c may sense the presence of the electric vehicle 405 and autonomously and selectively activate the appropriate base pads 415a-415r according to a detected presence or location of the electric vehicle 405. In other embodiments, the BAN modules 450a-450c may receive a signal comprising information regarding the electric vehicle 405 velocity and/or position or an activation command from a neighboring BAN module 450. The received signal may come directly from the neighboring BAN module 450 (e.g., a corresponding local controller 425) or via the distribution controller 445.

When a respective local controller 425 receives a signal from the distribution controller 445 to activate a specific base pad 415, the respective local controller 425 may activate the switch 420 corresponding to the specific base pad 415. As the vehicle 405 continues in the direction of travel, the local controllers 425a-425f may receive commands from the distribution controller 445 to activate or deactivate specific base pads 415a-415r based on the position of the vehicle pad 406. The local controllers 425a-425f may further control or regulate the current from the AC power backbone 430.

As depicted, the base pads 415 from consecutive local controllers 425 may be interleaved or interlaced such that a single local controller 425 may provide power to alternating base pads 415. Thus, the base pads 415 from a first local controller 425 may be proximally interleaved with the base pads 415 controlled by a second local controller 425 when the two local controllers 425 are within the same BAN module 450. Thus, alternating base pads 415 are powered by different local controllers 425 and one local controller need not simultaneously power two base pads 415. Additionally, preventing a single local controller 425 from providing current to consecutive base pads 415 may reduce power rating requirements of individual components, as each component need only be capable of handling the current load of a single base pad 415 at a given time.

A wireless power transfer system having unbalanced reactive power loading may be able to transfer less power than a system having a balanced reactive power loading between the power source (e.g. the AC power backbone 430) and the load, or receiver (e.g., the base pads 415). For example, unbalanced reactive power may result in thermal losses, voltage differences between the source and sink, and a decrease in voltage stability, among other factors. Accordingly, in some embodiments, the local controllers 425a-425f may each comprise a tuning circuit or network to tune the current, and consequently the power, available to currently activated base pad(s) 415. Such tuning circuits may allow for maintaining an optimum, or balanced VAr of the wireless charging system 400 within a small range (e.g., +/−5%) of the designed power tuning value.

In an exemplary dynamic wireless charging system, there may be a number of factors that impact the power supply tuning network. Certain systems may suffer from tuning capacitor aging. As a capacitor ages, the capacitive characteristics of the component may diminish. In an embodiment, the AC power backbone 430 may vary in length, affecting the overall VAr loading of the system. In an embodiment, various vehicle tuning topologies may affect the AC power backbone 430 VAr loading in different ways, reflecting different amounts of reactive power load back to the AC power backbone 430 (e.g., based on the vehicle charging system design).

In an embodiment, the tuning circuit or network may be configured to function with only one base pad 415 activated. In another embodiment, the tuning circuit or network may be configured to function with multiple base pads 415 being activated or be applied to one or more of the BAN modules 450a-450c. In another embodiment, the tuning circuit or network may be configured to function with a single base pad 415 or with multiple base pads 415 being activated and receiving a current from a respective local controller 425.

Figure 4B:
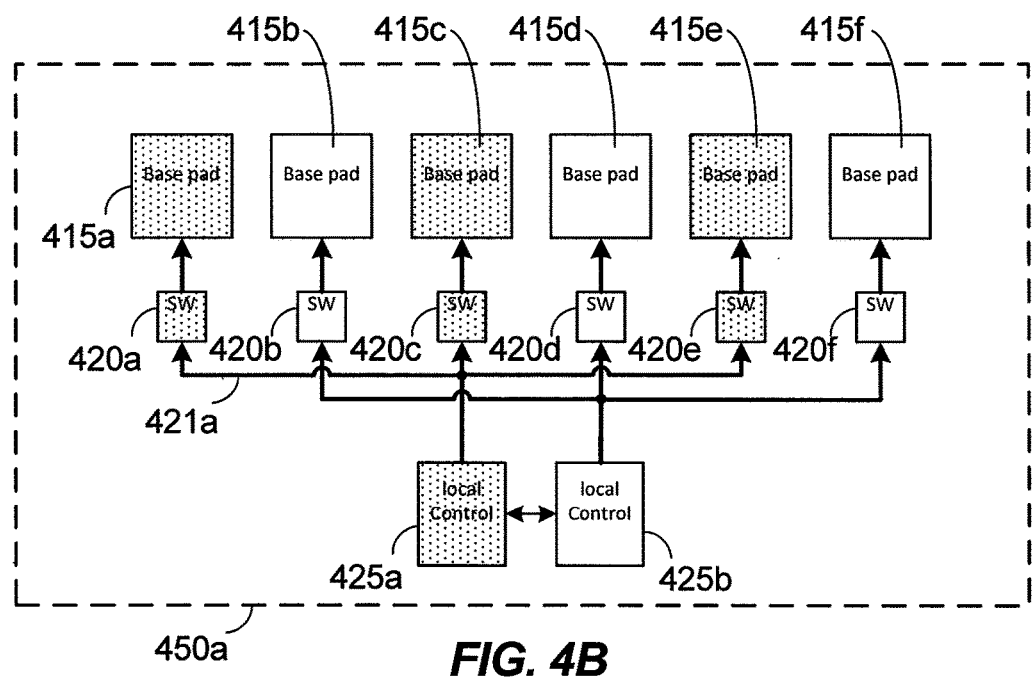
FIG. 4B illustrates a schematic view of a base array network module, in accordance with an embodiment.

FIG. 4B illustrates a schematic view of the BAN modules 450 and the components comprising the BAN module 450. FIG. 4B depicts the BAN module 450a (FIG. 4A) as a modular device comprising the base pads 415a-415f, the plurality of switches 420a-420f, and the plurality of local controllers 425a and 425b (as shown in FIG. 4) that may be included in a single enclosure. As depicted, the local controller 425a may be operably connected to distribution circuit 421a, which is connected to switches 420a, 420c, and 420e, which lead to base pads 415a, 415c, and 415e. Similarly, local controller 425b may be connected to distribution circuit 421b, switches 420b, 420d, and 420f, and base pads 415b, 415d, and 415f, in order. As shown, the respective components of the BAN modules 450 are shaded to indicate the common power distribution paths. The base pads 415 are laid out in a manner such that base pads 415 from adjacent local controllers 425 alternate in their layout in the BAN module 450. For example, base pads 415a, 415c, and 415e that may be connected to local controller 425a via switches 420a, 420c, and 420e, respectively, may be installed within the BAN module 450 in an interleaved manner with base pads 415b, 415d, and 415f that may be connected to local controller 425b via switches 420b, 420d, and 420f, respectively. Therefore, the pattern of installed base pads 415 in order of electric vehicle 405 travel may be 415a, 415b, 415c, 415d, 415e, and 415f.

As noted above, the switches 420*a*-420*f* may function to selectively couple the base pads 415*a*-415*f*, respectively, to the respective distribution circuit 421. The selective coupling may be in response to a signal received from one of local controllers 425*a* or 425*b* or from the distribution controller 445. When coupled, the base pad 415 may be capable of receiving a current from the local controller 425 via distribution circuit 421. In an embodiment, the local controllers 425*a*-425*f* (of FIG. 4A) may control a current flow to the base pads 415*a*-415*r* and may control the direction of the current flow through the base pads 415*a*-415*r*. In another embodiment, the switches 420*a*-420*r*, the distribution circuit 421, or the base pads 415*a*-415*r* themselves may control the direction of the current flow through the base pads 415*a*-415*r*. The control of the current flow direction through the base pad 415 may provide for minimizing mutual coupling and cross coupling between concurrently activated base pads 415 and adjacent base pads 415. The controlling of the current by the distribution circuits 421, local controllers 425 or the switches 420 discussed above may comprise at least one of controlling the magnitude of the current or the phase of the current being sent to the base pads 415. Such controlling by the distribution circuits 421, the local controllers 425, or the switches 420 may provide for the manipulation of the wireless fields generated by the base pads 415. In some embodiments, the phase of the current flow through the connected base pad 415 may be limited to one of zero or 180 degrees. In some other embodiments, the phase of the current flow may be any value between zero and 360 degrees. In operation, the BAN module 450 may operate as a sub-tree network of the dynamic wireless charging system 400. The BAN module 450 may function as a self-contained unit where its internal components may be coordinated and preassembled and connected such that the BAN module 450 is designed to distribute and control the current distribution over a limited distance. As depicted, internally there are two local controllers, 425*a* and 425*b*, two distribution circuits 421*a* and 421*b*, switches 420*a*-420*f*, and base pads 415*a*-415*f*.

Figure 5:
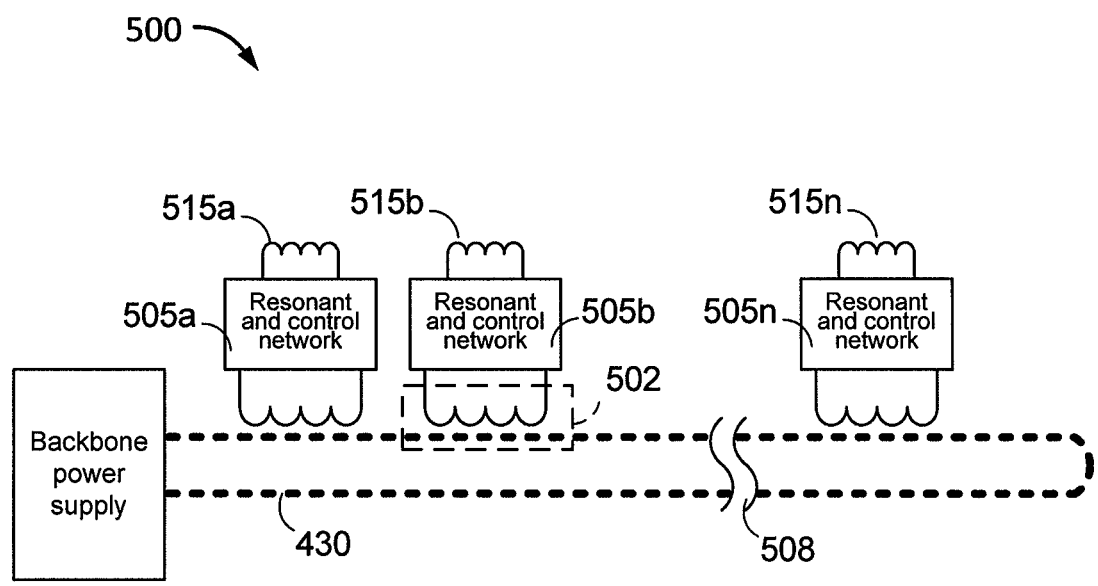
FIG. 5 depicts a block diagram of a wireless power transfer system in accordance with an embodiment.

FIG. 5 depicts a block diagram of a wireless power transfer system according to the disclosure. FIG. 5 shows a wireless power transfer system 500, comprising the backbone 430 (of FIG. 4A and FIG. 4B) and a series of resonant and control networks ("network") 505*a*-505*n*. The system 500 operates similarly to the system 400. Three networks 505 are shown, however a break 508 depicted in the backbone 430 indicates that any number of networks 505 may be implemented, in the same way a series of the BAN modules 450 may be utilized in the system 400. Each network 505 may function similarly to the local controllers 425, distribution circuits 421, and switches 420 as described above with respect to the BAN modules 450. Accordingly, the networks 505 may complete the switching functions of the switches 420 and providing current for the proper functioning of the base pads 515, shown as base pad 515*a* to base pad 515*n* corresponding to the networks 505. The base pads 515 may be substantially similar to the base pads 415, described above however the base pads 515 shown here may be representative of multiple base pads 415, in accordance with previous FIG. 4A and FIG. 4B.

In a roadway application, such as that shown in FIG. 4A, a number of double couple transformers 502 transfer power from the backbone 430 to each of the base pads 415. "Double couple," as used to herein, generally relates to the notion that there are two wireless couplings associated with each double couple transformer: a first coupling between the backbone 430 and the double couple transformer and a second coupling between the vehicle pad 415 and the vehicle pad 406, hence "double couple." According to FIG. 4A, the backbone 430 provides inductive power to a first coil or coils of the double couple transformer 502, which then provides current via the network of local controllers 425, distribution circuits 421, and switches 420, to one or more base pads 415 that is in turn coupled to the vehicle pad 406.

In some embodiments, each double couple transformer 502 may comprise at least one coil (e.g., a transformer) configured to wirelessly couple with the backbone 430 and receive wireless power. The double couple transformer 502 may then supply current and power via the network 505 to the base pad(s) 515. As noted above, the BAN modules 450 may comprise six base pads 415 each. The double couple transformers 502 shown in FIG. 5 are depicted as operationally coupled to a single base pad 515 for simplicity, however each BAN module 450 may further comprise two or more double couple transformers, for example, providing power to each of three of the base pads 415. Each double couple transformer 502 may comprise a series of windings around a core comprising ferromagnetic materials (shown below in connection with FIG. 6A and FIG. 6B). The core may comprise a ferrite or other ferromagnetic material. The double couple transformers 502 may operate similar to a transformer, receiving wireless power from the backbone 430 via a wireless field (not shown) similar to the wireless field 105. The wireless power received at the double couple transformer 502 may then be transferred through the network 505 and ultimately to the base pads 515.

FIG. 6A depicts one example of a balance control switching system 600. The system 600 may operate similar to the local controllers 425, switches 421, and the base pads 415. The system 600 may comprise a core 610 in proximity to the backbone 430. The core 610 may comprise a ferrite core or other suitable ferromagnetic material. The core 610 may have at least one series of windings comprising a coil 612 around the core 610 configured to wirelessly couple with a wireless field 605 produced by the backbone 430. The wireless field 605 may be a magnetic (electromagnetic) field similar to the wireless field 105 (FIG. 1) and the wireless field 205 (FIG. 3). In FIG. 6A, the core 610 is shown partially surrounding the backbone 430, however this should not be considered limiting. The core 610 may be disposed in other configurations allowing wireless coupling that do not surround the backbone 430, such as configurations where the core 610 is next to or alongside the backbone 430. The system 600 may be incorporated into the BAN module 450 providing circuitry and logic to transfer wireless power from the backbone 430 to the base pads 415.

The system 600 may further comprise a resonant and control network (network) 602 operationally coupled to the coil 612 and configured to selectively provide current to at least one base pad 615. The coil 612 may comprise a power coil for the double couple transformer 602, similar to the double couple transformer 502 of FIG. 5. The double couple transformer 602 may produce current for use by the resonant and control network 604 which may in turn selectively supply current to a series of base pads 615. The base pads 615 may operate similarly to the base pads 415 and the base pads 515, receiving current from the network 604 and providing wireless power to a wireless power receiver, such as the vehicle 405. The network 604 may operate similarly to the networks 505 and provide the functionality of the switches 420, distribution circuits 421, and the local controllers 425 of FIG. 4.

As noted above, the presence of the ferrite core 610 in proximity of the backbone 430 may increase the overall inductance (impedance) and affect the VAr loading as measured at the backbone 430 and/or the power supply/inverter 435. Whether or not the current induced in the coil 612 is used by the network 604, the core 610 represents an inductive load to the backbone 430. Accordingly, in some embodiments, additional inductors or capacitors may be included within the system 600 to compensate for variations in VAr loading. In some embodiments, this may be termed a compensation circuit. Inductors and capacitors may be used in series or in parallel with the inductive load to increase or decrease the VAr loading as measured at the power supply/inverter 435. However, such an active compensation circuit may commonly require the addition of separate electronic components, increasing the cost and complexity of the system. The system 600 however may not require such additional components in an active compensation circuit for VAr load compensation.

The system 600 may further comprise a plurality of control switches 620, shown here as a control switch 620a and a control switch 620b. The control switches 620 may operationally connect the coil 612 of the double couple transformer 602 to the network 604. The positions of each of the switches 620 may serve to adjust the impedance of the system 600 on the backbone 430 compensating for VAr loading.

In an embodiment, three primary switch states may be considered. In a first, powered state, the switch 620a is closed and the switch 620b is open. This powered switch state completes the circuit for the current induced in the double couple transformer 602 allowing the current to flow and convey or provide power to the network 604, and in turn to the base pad 615.

In a second, open circuit switch state, the switch 620a and the switch 620b are both open. This open circuit state opens the circuit, removing power from the circuit and eliminating current flow to the network 604 and the base pad 615. In the open state, the system 600 remains an inductive load (e.g., an impedance) on the backbone 430, increasing the VAr load.

In a third, short circuit switch state, switch. 620b is closed, short circuiting the coil 612 around the core 610. The short circuit switch state then nearly eliminates the system 600 as an inductive load on the backbone 430, reducing the impedance to a negligible value. By shorting the coil 612 of the double couple transformer 602 around ferrite core 610, the presence of the core 610 becomes nearly invisible to the backbone 430.

Accordingly, the incorporation of the control switches 620 providing the three states (powered, open, short) may serve as an inductive load compensation system using existing components (e.g., the system 600) without the addition of additional circuitry as noted above. In an embodiment, the inactive double couple transformers 502, 602 within a BAN module 450 may therefore be used to tune the overall VAr loading of the system 400.

FIG. 6B depicts a balance control switching system 650 having a ramp control switch according to the disclosure. In some embodiments, the system 650 may operate within the BAN module 450, providing switching control between the backbone 430 and the base pads 415. The balance control switching system 650 may be substantially similar to the balance control switching system 600 however, the system 650 comprises an additional power flow ramp controller (ramp controller) 660. In an embodiment, the ramp controller 660 comprises a control coil 662 having windings surround the core 610. The ramp controller 660 may further comprise a control switch 664 operably connected to the coil 662. In an embodiment, the ramp controller 660 may be adjacent to the double couple transformer 602, however the coil 612 and the coil 662 may be electrically isolated. Similar to the coil 612, the coil 662 may be situated within wireless field 605, thus the coil 662 may simultaneously wirelessly couple to the backbone 430 with the coil 612.

In an embodiment, the double couple transformer 602 of the system 600 (FIG. 6A) may support high voltages (e.g., 1 kV-4 kV) as noted above with respect to FIG. 4A. In such an environment, the resonant and control network 604 may be exposed to very high transient voltages when the coil 612 is shorted using only the switch 620b. The very high transient voltages may negatively affect the connected electronic components (e.g., of the resonant and control network 604, the switches 620, etc.) and in some embodiments may lead to component failure. Advantageously, in the embodiment shown in FIG. 6B, the switch 664 may be closed, shorting the coil 662 around the core 610 providing a shunt to the current induced in the coil 612. In an embodiment, the shorted coil 662 (and shunt) may reduce the amount of current induced (by the backbone 430) within the coil 612, allowing the resonant and control network 604 to short the switch 620b without the associated high transient voltages.

Figure 6C:
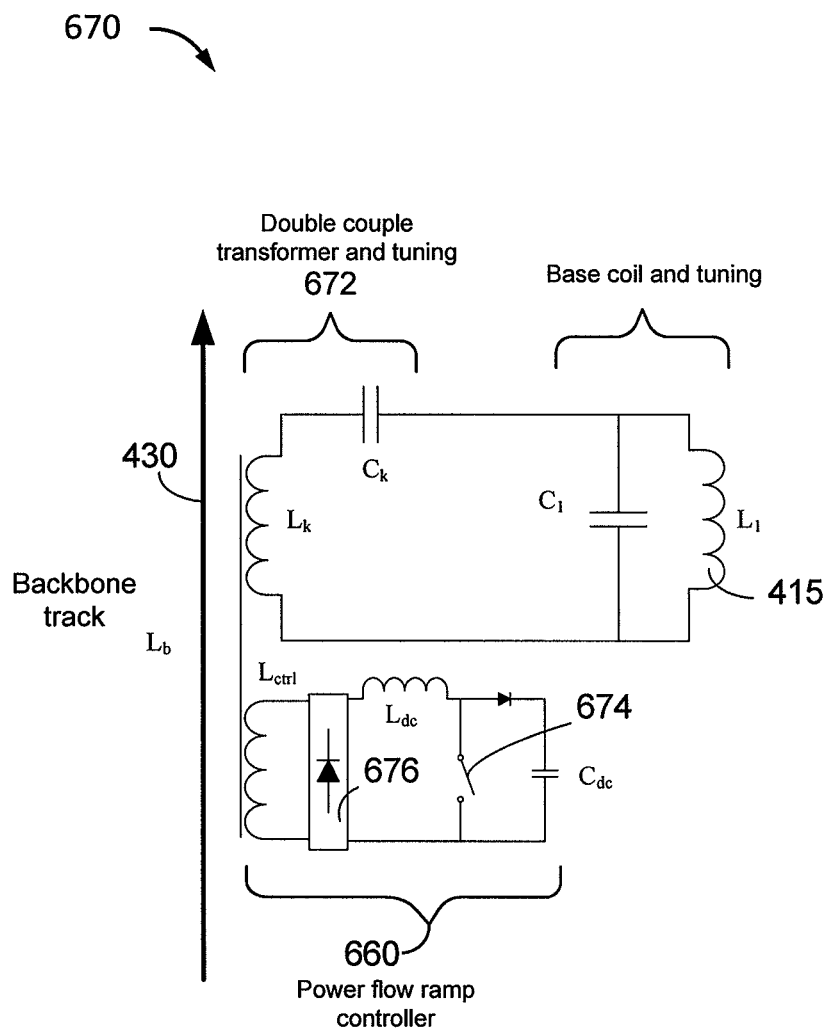
FIG. 6C illustrates a schematic diagram depicting the electrical relationship between the components of FIG. 6B.

FIG. 6C illustrates a schematic diagram 670 depicting the electrical relationship between the components of FIG. 6B. As shown, the backbone 430 is depicted on the left of FIG. 6C, having an inductance "$L_b$," coupled to a double couple transformer 672. The double couple transformer 672 may be similar to the double couple transformers 502, 602 described above. The double couple transformer 672 is represented by the inductive load "$L_k$" (e.g., an inductive load) and a tuning capacitor "$C_k$." The tuning capacitor "$C_k$" may be implemented for load compensation at the double couple transformer 672. The base pad 415 (FIG. 4) may be represented by an inductive load "$L_1$" and an associated tuning capacitor or capacitive load "$C_1$." The $L_1$ may represent at least one base pad 415. In at least one embodiment, the $L_1$ may represent three or more base pads 415.

FIG. 6C further depicts the ramp controller 660 (FIG. 6B) also coupled to the backbone 430. As shown, an inductive load "$L_{ctrl}$" may be representative of the control coil 662 (of FIG. 6B). The control coil $L_{ctrl}$ may be operably coupled in parallel with a diode 676, and further operable coupled in series to a load comprising an inductive load "$L_{dc}$" and a capacitive load, "$C_{dc}$." A control switch 674, similar to the switch 662 (FIG. 6B) may be placed across the two inductive loads $L_{ctrl}$ and $L_{dc}$, in order to achieve the shunt current discussed in connection with FIG. 6B. Accordingly, when the switch 674 is closed, the induced current in the inductive load $L_k$ is reduced to a manageable level.

Figure 7:
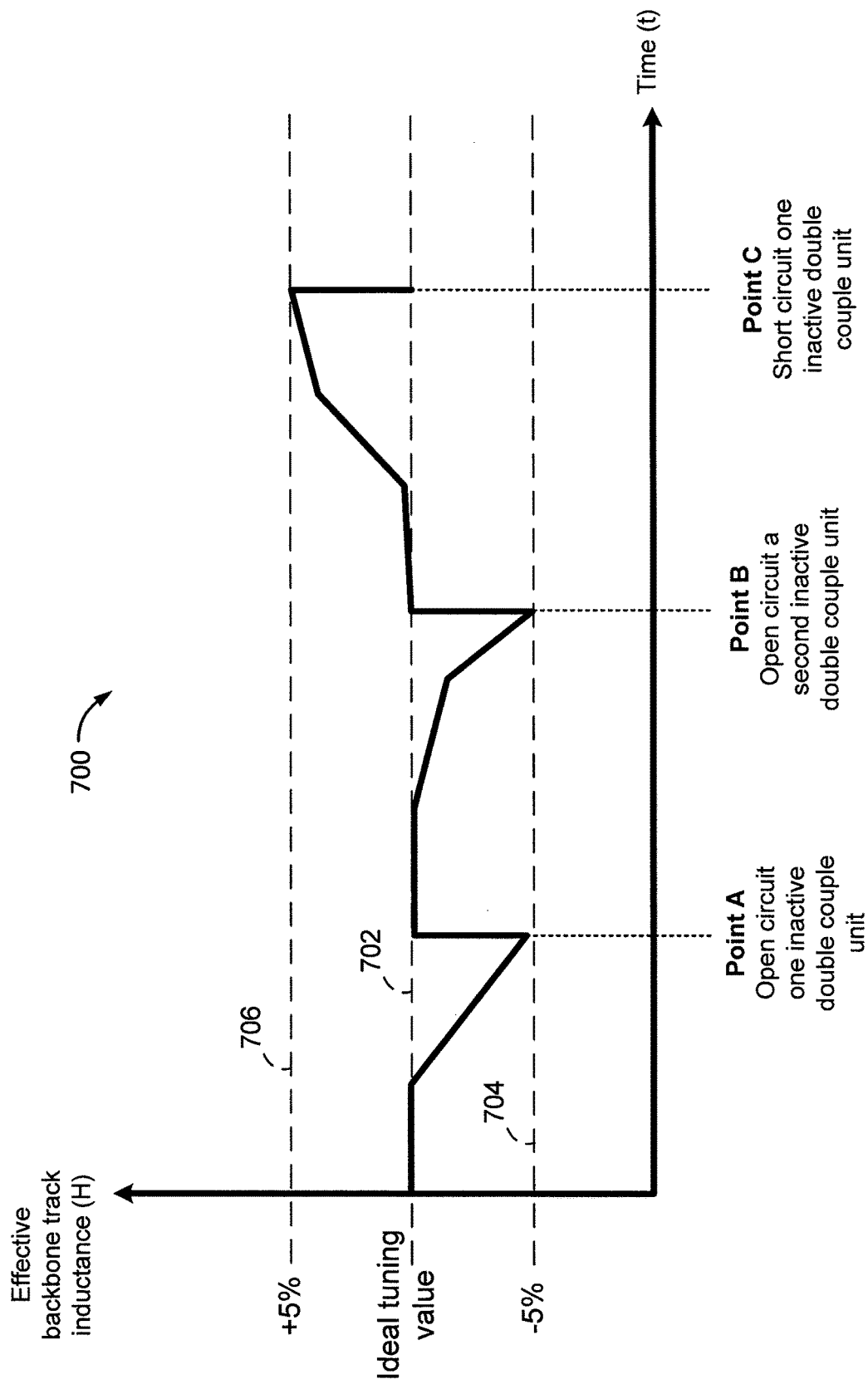
FIG. 7 depicts a chart showing variations in reactive power (VAr) loading according to the disclosure.

FIG. 7 depicts a chart 700 showing variations in reactive power (VAr) loading according to the disclosure and in conjunction with the embodiments described above. The X axis of the chart 700 describes time (t) and the Y axis of the chart 700 depicts effective backbone 430 track inductance (henry (H)) as measured at the power supply/inverter 435. An ideal tuning line 702 is depicted between a negative value line 704 and a positive value line 706. In an embodiment, ideal VAr loading may vary between minus five percent (−5%) of the ideal tuning line 702. The minus five percent is indicated by the negative value line 704 and the plus five percent (+5%) as indicated by the positive value line 706. The ideal tuning line 702 may further represent a balanced VAr load or reactance. Such a balance may be generally considered the conditions under which the reactive power produced by the backbone 430 (FIG. 4A) equals the reactive power consumed by the load on the backbone 430.

As a non-limiting example, the load on the backbone 430 may comprise the series of BAN modules 450 as shown in FIG. 4A and the vehicle 405. In certain embodiments, the load may further comprise certain aspects of the systems 400, 500, 600, 650 described in connection with FIG. 4B through FIG. 6C. It is to be appreciated that +/−5 percent may be adjusted based on system architecture and other power-related factors and is provided only as an example.

As shown, when the effective backbone track inductance falls below the ideal tuning value at Point A (e.g., to minus five percent) then the resonance and control network 604 (FIG. 6A, FIG. 6B) may open the switches 620 on an inactive double couple transformer 602, increasing the effective inductive load as measured at the power supply/inverter 435. In an embodiment, when the inductive load further increases at Point B, the resonance and control network 604 may open the switches 620 (open circuit) on a second inactive double couple transformer 602, further increasing the inductive load. When the inductive load further increases at Point C, the resonance and control network 604 may short circuit an inactive double couple transformer 602 which may reduce the effective inductive load of that double couple transformer 602 at the backbone 430 to a nearly negligible value. Accordingly, the resonance and control networks 604, as commanded by a respective local controller 425 (FIG. 4) may be used to compensate for variations in VAr loading by open circuiting or short circuiting one of the plurality of double couple transformers 602 within the BAN module 450 array that comprised the system 400 (FIG. 4A).

Figure 8:
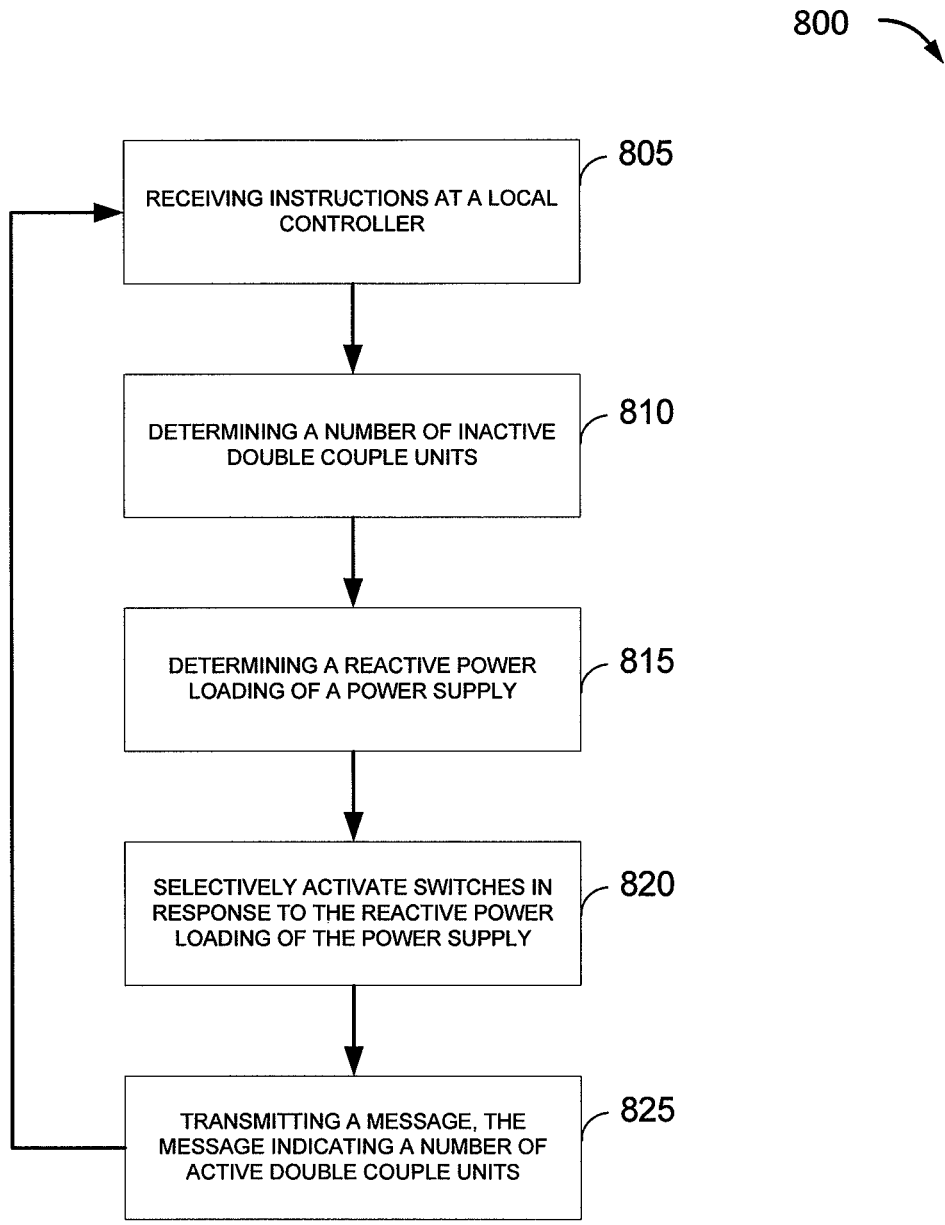
FIG. 8 is a flowchart depicting a method according to the disclosure.

FIG. 8 is a flowchart depicting a method according to the disclosure. FIG. 8 shows a method 800 describing a method for reactive power (VAr) compensation in a dynamic wireless charging system using inactive electronic components. In particular, the method 800 describes the use of one or more inactive double couple transformers 602 within the exemplary system 400 to increase or decrease the inductive load as measured at the power supply/inverter 435 in order to maintain maximum power transfer between the backbone 430 and the base pads 415 (FIG. 4A). By open-circuiting or short-circuiting one or more coils in a double couple transformer 602 (FIG. 6), the effective inductance as measured at the power supply/inverter 435 may compensated or otherwise adjusted to a desired level in discrete steps.

The method 800 begins with block 805 wherein the local controller 425 (FIG. 4) may receive instructions from the distribution controller 415 (FIG. 4A). The instructions may comprise indicating a presence of an electric vehicle 405 (FIG. 4A) in proximity to one or more base pads 415 (FIG. 4A). The instructions may further comprise a command to activate one or more of the connected double couple transformers 602 and/or the base pads 415. The distribution controller may provide instructions to one or more local controllers to activate one or more base pads 415 in order to provide wireless power to the electric vehicle 405. The instructions may further indicate a specific sequence in which the base pads 415 are to be activated and deactivated.

At block 810, the local controller 425 may determine a total number of active and inactive double couple transformers 602 during wireless charging operations of the system 400. The determining may comprise monitoring the number of active and inactive base pads 415 connected to the local controller 425. The determining may comprise monitoring the number of active and double couple transformers 602 connected to the local controller 425. The determining may further comprise receiving an indication from an adjacent local controlled 425 or BAN module 450 indicating the total number of active and inactive base pads 415 or the total number of active and inactive double couple transformers 602 active in the entire system 400.

At block 815 the local controller may determine a reactive power loading of a power supply. The determining may comprise determining in a single BAN module 450, of which the local controller 425 is a part, the value of the reactive power loading. The determination at block 815 may further comprise receiving an indication from an adjacent BAN module 450 of the reactive power loading in the adjacent BAN module 450. For example, the BAN module 450b (FIG. 4A) may provide an indication of its reactive power load in the presence of the vehicle 405 to the BAN module 450a such that the local controllers 425a, 425b may activate the associated switches 420a-420f. The determination at block 815 may further comprise an indication from the distribution controller 445 of the reactive power loading at the power supply/inverter 435.

At block 820, the local controller 425 may further selectively activate the control switches 420, 620 in response to the reactive power loading. In an embodiment, the local controller 425 may activate the control switches 620 to open the circuit (e.g., the open circuit state of FIG. 6A) and remove current from the resonant and control network 604. In an embodiment, the local controller 425 may activate the control switches 620 to short circuit (e.g., the third, short circuit state of FIG. 6A) to short the coil 612 (FIG. 6A, FIG. 6B) around the core 610. The open, short, and powered states of the control switches 620 may be selectively activated in response to the reactive power load of the power supply/inverter 435. The local controller 425 may autonomously select the switch 620 states in response to indications from the distribution controller 445 and the determination of the number of active and inactive double couple transformers in block 810.

In block 825, the local controller 425 may transmit a message indicating the number of active and inactive double couple transformers 602. In an embodiment, the message may further indicate a switch 620 position. In an embodiment, the message may be transmitted as a feedback signal to the distribution controller 445. In an embodiment, the message may be transmitted to an adjacent BAN module 450 or to one of the local controllers 425 therein. These messages may provide a feedback signal or an advanced warning to adjacent local controllers 425 to expect a change in the reactive power loading. Such a message may increase the effectiveness of reactive power load compensation.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such embodiment decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device for dynamically tuning reactive power in an inductive power transfer system comprising:
    a first plurality of coils, each coil operably coupled to a respective ferromagnetic material and configured to receive wireless power via the ferromagnetic material from a power source;
    a plurality of switches associated with each of the first plurality of coils, the switches configured to selectively control power received by certain of the first plurality of coils;
    a second plurality of coils configured to receive current from respective ones of the first plurality of coils, the second plurality of coils further configured to deliver wireless power to a wireless power receiver; and
    at least one control unit configured selectively activate the switches, the switches being configurably set to at least one of:
        convey power from the power source to at least one of the plurality of the second coils via at least one of the plurality of first coils; or
        selectively increase or decrease the reactive power load of the power source.

2. The device of claim 1, wherein the control unit may selectively increase or decrease the reactive power load by setting the switches to one of a short circuit state or an open circuit state.

3. The device of claim 1, wherein the control unit further receives an input including a message from a distribution controller, the message indicative of a reactive power load of the power source.

4. The device of claim 1, wherein the control unit further receives an input including a message from a distribution controller, the message configured to contain instructions to activate the switches to achieve a designated reactive power load.

5. The device of claim 1, wherein the control unit further receives an input including a message from a local controller, the message indicative of a switch position of an adjacent plurality of switches.

6. The device of claim 1, wherein the at least one control unit is further configured to send a message, the message indicative of the position of the plurality of switches.

7. The device of claim 1, wherein the control unit is further configured to determine a reactive power load of the power source and command switch activation or receive switch activation instructions from higher order controller.

8. A method for dynamically tuning reactive power in an inductive power transfer system comprising:
    receiving at a first plurality of coils, wireless power via a ferromagnetic material from a power source, wherein each coil of the first plurality of coils is operably coupled to the respective ferromagnetic material;
    selectively controlling, at a plurality of switches, power received by certain of the first plurality of coils, wherein each switch of the plurality of switches is associated with each coil of the first plurality of coils;
    receiving, at a second plurality of coils, current from respective ones of the first plurality of coils;
    delivering, by the second plurality of coils, wireless power to a wireless power receiver; and
    selectively activating the switches by at least one control unit, wherein the switches are configurably set to at least one of:

convey power from the power source to at least one of the plurality of the second coils via at least one of the plurality of first coils; or selectively increase or decrease the reactive power load of the power source.

9. The method of claim 8, wherein the selectively activating comprises setting the switches to one of a short circuit state or an open circuit state.

10. The method of claim 8, wherein the control unit further receives an input including a message from a distribution controller, the message indicating a reactive power load of the power source.

11. The method of claim 8, wherein the control unit further receives an input including a message from a distribution controller, the message containing instructions to activate the switches to achieve a designated reactive power load.

12. The method of claim 8, wherein the control unit further receives an input including a message from a local controller, the message indicating a switch position of an adjacent plurality of switches.

13. The method of claim 8, wherein the at least one control unit is further configured to send a message, the message indicating the position of the plurality of switches.

14. The method of claim 8, wherein the control unit is further configured to determine a reactive power load of the power source and command switch activation or receive switch activation instructions from higher order controller.

15. An apparatus for dynamically tuning reactive power in an inductive power transfer system comprising:
first means for receiving wireless power via a ferromagnetic material from a power source, wherein each first receiving means is operably coupled to the respective ferromagnetic material;
means for selectively controlling power received by certain of the first receiving means, wherein controlling means is associated with each of the first receiving means;
second means for receiving current from respective ones of the first receiving means;
means for delivering wireless power to a wireless power receiver; and
means for selectively activating the controlling means, wherein the each controlling means is configurably set to at least one of:
convey power from the power source to at least one of the plurality of the second receiving means via at least one of the first receiving means; and
selectively increase or decrease the reactive power load of the power source.

16. The apparatus of claim 15, wherein the first receiving means comprises a first plurality of coils, and wherein the controlling means comprises a plurality of switches, and wherein the second receiving means comprises a second plurality of coils, and wherein the deliver means comprises the second plurality of coils, and wherein the activating means comprises at least one controller.

17. The apparatus of claim 15, wherein the activating means may set the controlling means to one of a short circuit state or an open circuit state.

18. The apparatus of claim 15, wherein the control unit further receives an input including a message from a distribution controller, the message indicating a reactive power load of the power source.

19. The apparatus of claim 15, wherein the control unit further receives an input including a message from a distribution controller, the message containing instructions to activate the controlling means to achieve a designated reactive power load.

20. The apparatus of claim 15, wherein the control unit further receives an input including a message from a local controller, the message indicating a position of an adjacent controlling means.

21. The apparatus of claim 15, wherein the at least one activating means is further configured to send a message, the message indicating the position of the controlling means.

22. The apparatus of claim 15, wherein the activating means is further configured to determine a reactive power load of the power source and command controlling means activation or receive controlling means activation instructions from higher order activating means.

23. A non-transitory computer-readable medium comprising instructions, that when executed, cause a inductive power transfer system to:
receive at a first plurality of coils, wireless power via a ferromagnetic material from a power source, wherein each coil of the first plurality of coils is operably coupled to the respective ferromagnetic material;
selectively control, at a plurality of switches, power received by certain of the first plurality of coils, wherein each switch of the plurality of switches is associated with each coil of the first plurality of coils;
receive, at a second plurality of coils, current from respective ones of the first plurality of coils;
deliver, by the second plurality of coils, wireless power to a wireless power receiver; and
selectively activate, by at least one control unit, the switches, wherein the switches are configurably set to at least one of:
convey power from the power source to at least one of the plurality of the second coils via at least one of the plurality of first coils; or
selectively increase or decrease the reactive power load of the power source.

24. The non-transitory computer-readable medium of claim 23, wherein the control unit may selectively increase or decrease the reactive power load by setting the switches to one of a short circuit state or an open circuit state.

25. The non-transitory computer-readable medium of claim 23, wherein the control unit further receives an input including a message from a distribution controller, the message indicating a reactive power load of the power source.

26. The non-transitory computer-readable medium of claim 23, wherein the control unit further receives an input including a message from a distribution controller, the message containing instructions to activate the switches to achieve a designated reactive power load.

27. The non-transitory computer-readable medium of claim 23, wherein the control unit further receives an input including a message from a local controller, the message indicating a switch position of an adjacent plurality of switches.

28. The non-transitory computer-readable medium of claim 23, wherein the at least one control unit is further configured to send a message, the message indicating the position of the plurality of switches.

29. The non-transitory computer-readable medium of claim 23, wherein the control unit is further configured to determine a reactive power load of the power source and command switch activation or receive switch activation instructions from higher order controller.

* * * * *